(12) United States Patent
Heck et al.

(10) Patent No.: US 9,784,350 B2
(45) Date of Patent: Oct. 10, 2017

(54) LINEAR MOTION ASSEMBLY, IMPROVED WIPER AND SCRAPER ASSEMBLY THEREFOR AND METHODS OF ASSEMBLY THEREOF

(71) Applicant: MEGGITT-USA, INC., Simi Valley, CA (US)

(72) Inventors: Mason E. Heck, Standish, MI (US); Stephen R. Ahlers, Saginaw, MI (US)

(73) Assignee: Meggitt-USA, Inc., Simi Valley, CA (US)

( * ) Notice: Subject to any disclaimer, the term of this patent is extended or adjusted under 35 U.S.C. 154(b) by 422 days.

(21) Appl. No.: 14/628,030

(22) Filed: Feb. 20, 2015

(65) Prior Publication Data
US 2015/0233457 A1   Aug. 20, 2015

Related U.S. Application Data

(60) Provisional application No. 61/942,467, filed on Feb. 20, 2014.

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/24* | (2006.01) |
| *F16H 25/22* | (2006.01) |

(52) U.S. Cl.
CPC ..... *F16H 25/2418* (2013.01); *F16H 25/2204* (2013.01); *Y10T 29/4984* (2015.01); *Y10T 74/18712* (2015.01)

(58) Field of Classification Search
CPC .................. F16H 25/2418; F16H 25/2204
USPC .......................................... 277/354
See application file for complete search history.

(56) References Cited

U.S. PATENT DOCUMENTS

| | | | | |
|---|---|---|---|---|
| 4,407,511 | A * | 10/1983 | Benton | F16H 25/2418 277/354 |
| 2008/0196523 | A1* | 8/2008 | Liu | F16H 25/2418 74/89.4 |
| 2010/0000353 | A1* | 1/2010 | Liu | F16H 25/2418 74/89.4 |

* cited by examiner

*Primary Examiner* — William Kelleher
*Assistant Examiner* — Jake Cook
(74) *Attorney, Agent, or Firm* — John D. Wright; Dickinson Wright PLLC

(57) ABSTRACT

A wiper and scraper assembly for a linear motion assembly has a wiper and a scraper constructed from separate pieces of material. The wiper has a width extending between opposite sides with an opening extending through the opposite sides, with a first helical thread of the wiper being received in an external groove of a screw of the linear motion assembly. The scraper is disposed in the opening of the wiper, and has a second helical thread received in the external groove of the screw. The wiper has at least one lubrication return plow extending into one of its opposite sides, with the lubrication return plow facing axially inwardly into a nut of the linear motion assembly. The wiper has at least one debris ejection plow formed in the first helical thread, with the debris ejection plow facing axially outwardly from the ball nut.

15 Claims, 17 Drawing Sheets

LINEAR MOTION ASSEMBLY, IMPROVED WIPER AND SCRAPER ASSEMBLY THEREFOR AND METHODS OF ASSEMBLY THEREOF

CROSS-REFERENCE TO RELATED APPLICATION

This application claims the benefit of U.S. Provisional Application Ser. No. 61/942,467, filed Feb. 20, 2014, which is incorporated herein by reference in its entirety.

BACKGROUND OF THE INVENTION

1. Technical Field

This invention relates generally to linear motion assemblies, and more particularly to linear motion assemblies having wipers and scrapers and to their method of assembly.

2. Related Art

Linear motion assemblies, such as ball screw assemblies, for example, are used to effect linear actuation in various industries, such as machine tool, automotive, aircraft and aerospace, for example. Typically, a commercial ball screw assembly includes a screw with a continuous external helical ball groove and a ball nut with a continuous internal helical ball groove. The external helical ball groove of the ball screw and the internal helical ball groove of the ball nut are configured with substantially identical continuous and uninterrupted leads (turns per inch). With the ball nut received coaxially about the ball screw, the respective internal and external helical ball grooves are arranged opposite one another in radially aligned relation and a plurality of balls are disposed in a continuous helical ball raceway formed between the aligned internal and external helical ball grooves.

Typically, an elastic wiper and relatively rigid scraper are provided within counterbores at opposite ends of the ball nut. The scrapers are located and extend axially outwardly from respective wipers, such that the scrapers have direct exposure to the external environment, while the wipers are located and extend axially inwardly from the scrapers and are shielded from the external environment by the scrapers. The scrapers primarily function to prevent the ingress of heavy external debris and to break-up debris, such as ice or dirt, for example, as the screw and nut translate relative to one another. On the other hand, the wipers primarily function to wipe lubrication along the screw during relative translation, and in doing so, act to push the lubrication axially inwardly away from the opposite ends to prevent the egress of the lubrication from the ball nut. Accordingly, the scraper acts to keep contamination out of the ball nut, while the wiper acts to keep lubrication in the ball nut.

If debris is able to find its way past a scraper, the debris is then brought into contact with the wiper, which as explained above, functions to direct matter inwardly into the ball nut. As such, any debris encountering the wiper is then pumped inwardly into the ball nut, which over time can shorten the useful life of the ball screw assembly. This, of course, can lead to increased maintenance, which in turn means downtime, and further can increase component cost due to the need for potential replacement of parts.

In addition to the above, known scraper and wiper assemblies occupy a required amount of axial space, which generally approaches the combined axial distance of their individual axial lengths. Of course, in many applications, particularly those sensitive to weight, space is generally at a premium, and thus, any space savings that can be gained is generally welcomed.

Further yet, known scraper and wiper assemblies require separate retention mechanisms for each component, thereby adding to the complexity of the designs of the separate components, and further requiring added expense to provide separate retention features. For example, it is known to form interlocking keys on both the scraper and wiper to prevent relative rotation therebetween, and further, to use a separate anti-rotation device, such as a set screw or tang on the scraper, for example, to prevent relative rotation between the scraper and the ball nut. As such, having to incorporate multiple anti-rotation mechanisms inherently adds cost to the individual components, as well as adding cost to the process for assembly.

Accordingly, scraper and wipers assemblies used in linear motion assemblies can be improved to enhance performance, to extend their useful life, and too reduce space requirements and total cost.

SUMMARY OF THE INVENTION

A linear motion assembly constructed in accordance with one aspect of the invention includes a ball nut having a through bore extending between opposite ends, with the through bore having an internal helical groove. The assembly further includes a screw having an external helical thread disposed through the through bore of the ball nut, with the external helical groove being radially aligned with the internal helical groove to define a ball raceway. Further yet, the assembly includes a wiper and scraper assembly disposed in each of the opposite ends of the ball nut. Each of the wiper and scraper assemblies include a wiper and a scraper constructed from separate pieces of material. The wiper has a width extending between opposite sides with an opening extending through the opposite sides, with a first helical thread of the wiper being received in the external groove of the screw. The scraper is disposed in the opening of the wiper, and has a second helical thread received in the external groove of the screw. The wiper has at least one lubrication return plow extending into one of its opposite sides, with the lubrication plow facing axially inwardly into the ball nut to maintain lubrication within the ball nut. The wiper also has at least one debris ejection plow formed in the first helical thread and facing axially outwardly from the ball nut to push debris axially outwardly from the ball nut.

In accordance with another aspect of the invention, the thread of the scraper has at least one window axially aligned with the at least one debris ejection plow to allow the debris to be expelled by the at least one debris ejection plow through the at least one window.

In accordance with another aspect of the invention, the wiper and scraper assembly has a total width substantially the same as the width of the wiper, thereby minimizing the axial space occupied by the wiper and scraper assembly.

In accordance with another aspect of the invention, the wiper has an outer wall with a portion overlying and retaining the scraper against axial separation from the wiper.

In accordance with another aspect of the invention, the outer wall of the wiper has a cylindrical portion and a frustroconical portion extending radially outwardly from the cylindrical portion, wherein the frustroconical portion is automatically biased radially inwardly by said ball nut during assembly to retain the scraper against axial separation from the wiper.

In accordance with another aspect of the invention, the ball nut has at least one slot extending into each of its opposite ends, and the frustroconical portion of the wiper has at least one recessed notch, and the scraper has at least one radially outward extending tab disposed in the at least one slot and in the at least one recessed notch to prevent relative rotation between the ball nut, the wiper and the scraper.

A linear motion assembly constructed in accordance with another aspect of the invention includes a screw having a helical external groove extending over a plurality of turns and a ball nut having a through bore extending between opposite ends, wherein the opposite ends each have a counterbore and the through bore receives the screw therein. The through bore has a helical internal groove extending over a plurality of turns, wherein the external groove of the screw is radially aligned with the internal groove of the ball nut to form a ball raceway having a plurality of load bearing balls disposed therein. A recirculation member is configured to recirculate the balls through the raceway. The ball nut further includes a wiper and scraper assembly disposed in the opposite ends. The wiper and scraper assembly includes an elastomeric, pliable wiper and a rigid scraper. The wiper has an outer cylindrical wall portion configured for close receipt in the counterbore of the ball nut and an annular frustroconical portion configured for an interference fit within the counterbore of the ball nut, with an opening extending between opposite first and second sides of the wiper. The opening has a helical internal thread adjacent the first side, wherein the helical internal thread of the wiper is configured for wiping contact with the external groove of the screw. The wiper further includes an annular groove between the helical internal thread of the wiper and an annular, radially inwardly extending lip at the second end, such that the lip extends radially inwardly from an end of the frustroconical portion. The frustroconical portion is flared radially outwardly adjacent the second side in an uninstalled state and is compressed radially inwardly via an interference fit within the counterbore of the ball nut in an installed state to facilitate forming a seal and retention of the scraper. The scraper has an outer cylindrical wall configured for close receipt in the opening of the wiper and an inner surface extending between opposite first and second sides. The inner surface has a helical internal thread adjacent the first side, wherein the helical internal thread of the scraper is configured for a slight clearance fit in the external groove of the screw. Upon installation of the wiper and scraper assembly into the ball nut, the lip of the wiper is automatically collapsed radially inwardly into overlapping relation with the second side of the scraper via interference with the counterbore of the ball nut to automatically capture the scraper from becoming inadvertently disassembled from the wiper.

In accordance with another aspect of the invention, the internal thread of the wiper has at least one recessed pocket with inclined sidewalls facing the scraper and the scraper has a window, also referred to as notch, axially aligned with the recessed pocket, wherein the sidewalls act to direct debris axially outwardly from the nut through the notch.

In accordance with another aspect of the invention, outer cylindrical wall of the wiper has at least one recessed notch extending axially into the second end of the wiper and the scraper has a radially outwardly extending tab disposed in the recessed notch, wherein the tab and recessed notch interact to prevent relative rotation between the wiper and the scraper.

In accordance with yet another aspect of the invention, a wiper and scraper assembly for a linear motion assembly is provided. The wiper and scraper assembly includes a wiper having a width extending between opposite sides with an opening extending through the opposite sides. The wiper has a radially inwardly extending first helical thread and at least one lubrication return plow extending into one of the opposite sides, such that the lubrication return plow faces axially in a first direction. The wiper further has at least one debris ejection plow formed in the first helical thread, wherein the debris ejection plow faces axially in a second direction opposite the first direction. The wiper and scraper assembly further includes a scraper disposed in the opening of the wiper. The scraper has a radially inwardly extending second helical thread and at least one window extending through the thread. The at least one window is axially aligned with the at least one debris ejection plow of the wiper to allow debris to be expelled by the at least one debris ejection plow through the at least one window.

In accordance with a further aspect of the invention, a method of assembling a linear motion assembly is provided. The method includes providing a ball nut having a through bore extending between opposite ends and having an internal helical groove; providing a screw having an external helical thread; providing a plurality of balls; providing a pair of wipers, with each of the wipers having an outer wall and a width extending between opposite sides of the wall and having an opening extending through the opposite sides, and having a radially inwardly extending first helical thread, at least one lubrication return plow extending into one of the opposite sides and facing axially in a first direction and at least one debris ejection plow formed in the first helical thread and facing axially in a second direction opposite the first direction, the outer wall having a cylindrical portion and a frustroconical portion extending radially outwardly from the cylindrical portion; providing a pair of scrapers, each of the scrapers having a radially inwardly extending second helical thread, and having at least one window extending through the second helical thread. The method further includes disposing the scrapers in the openings of the wipers to form wiper and scraper assemblies, with the at least one window being axially aligned with the at least one debris ejection plow. Further, disposing the screw through the through bore of the ball nut. Further yet, disposing the wiper and scraper assemblies about the screw and into the opposite ends of the ball nut with the cylindrical portions of the wipers extending into the ball nut and the frustroconical portions of the wipers being automatically biased radially inwardly via an interference fit in counterbores extending into the opposite ends of the ball nut to capture the scraper against axial separation from the wiper; and loading the balls into the through bore between the internal groove of the ball nut and the external groove of the screw.

In accordance with another aspect of the invention, the method includes providing the frustroconical portions having a radially inwardly extending annular lip and capturing the scrapers against axial separation from the wipers with the lips as the frustroconical portions are biased radially inwardly.

In accordance with another aspect of the invention, the method includes providing each of the frustroconical portions with at least one recessed notch, and providing each of the scrapers having at least one radially outward extending tab, and disposing the tabs into the recessed notches to prevent relative rotation between the wiper and the scraper.

In accordance with another aspect of the invention, the method includes providing each of the opposite ends of the ball nut with a slot and disposing the tabs in the slots to prevent relative rotation between the wiper and scraper assemblies and the ball nut.

As such a wiper and scraper assembly constructed in accordance with the invention, among other objects, features and advantages which will become readily apparent to those skilled in the art, provides a mechanism for automatically interlocking a scraper to a wiper of the wiper and scraper assembly upon installation of the assembly into an end of a housing of a linear motion assembly, provides a mechanism to expel debris finding its way past the scraper outwardly from the housing of the linear motion assembly while maintaining lubrication therein, extends the useful life of the linear motion assembly by preventing the ingress of contamination and preventing the egress of lubrication, has a relatively compact outer envelope, and is economical in manufacture.

BRIEF DESCRIPTION OF THE DRAWINGS

These and some other objects, features and advantages of the invention will become readily apparent to those having ordinary skill in the art of recirculating ball-type linear motion assemblies in view of the following detailed description of the presently preferred embodiments and best mode, appended claims, and accompanying drawings, in which:

DETAILED DESCRIPTION OF PRESENTLY PREFERRED EMBODIMENTS

Figure 1:
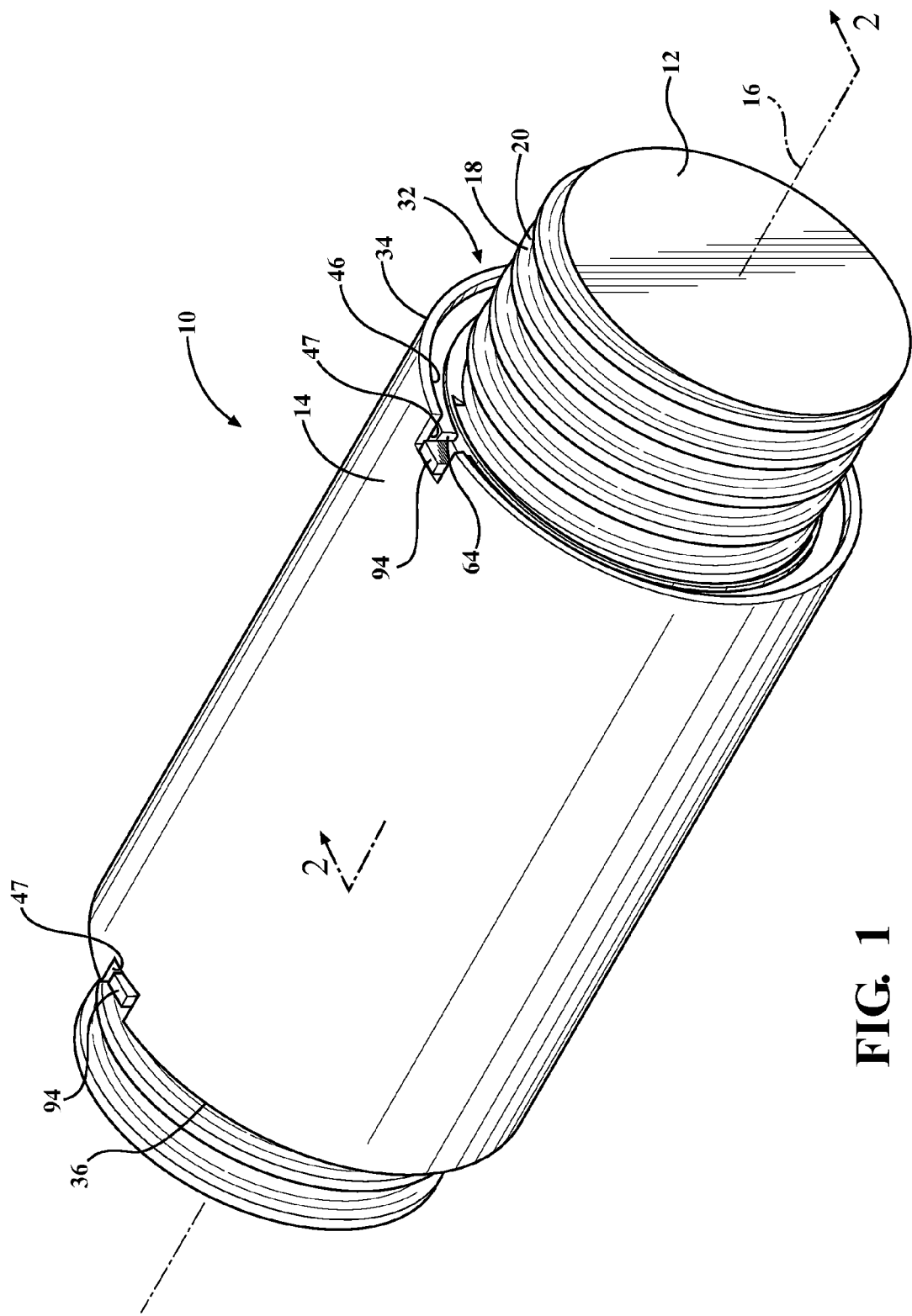
FIG. 1 is a perspective view of a linear motion assembly constructed in accordance with one presently preferred aspect of the invention.
Figure 2:
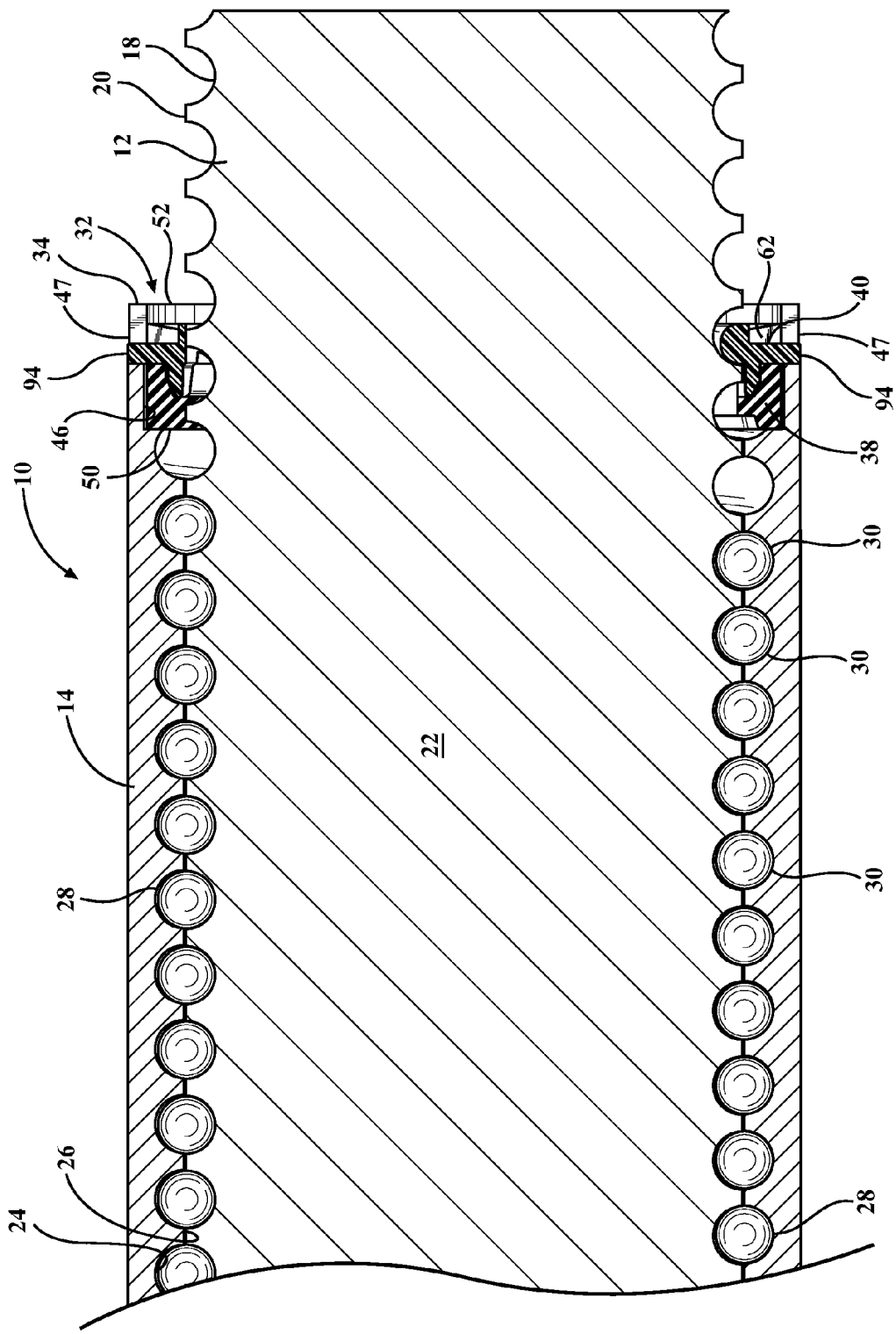
FIG. 2 is a fragmentary cross-sectional view of the linear motion assembly of FIG. 1 taken generally along line 2-2.
Figure 3:
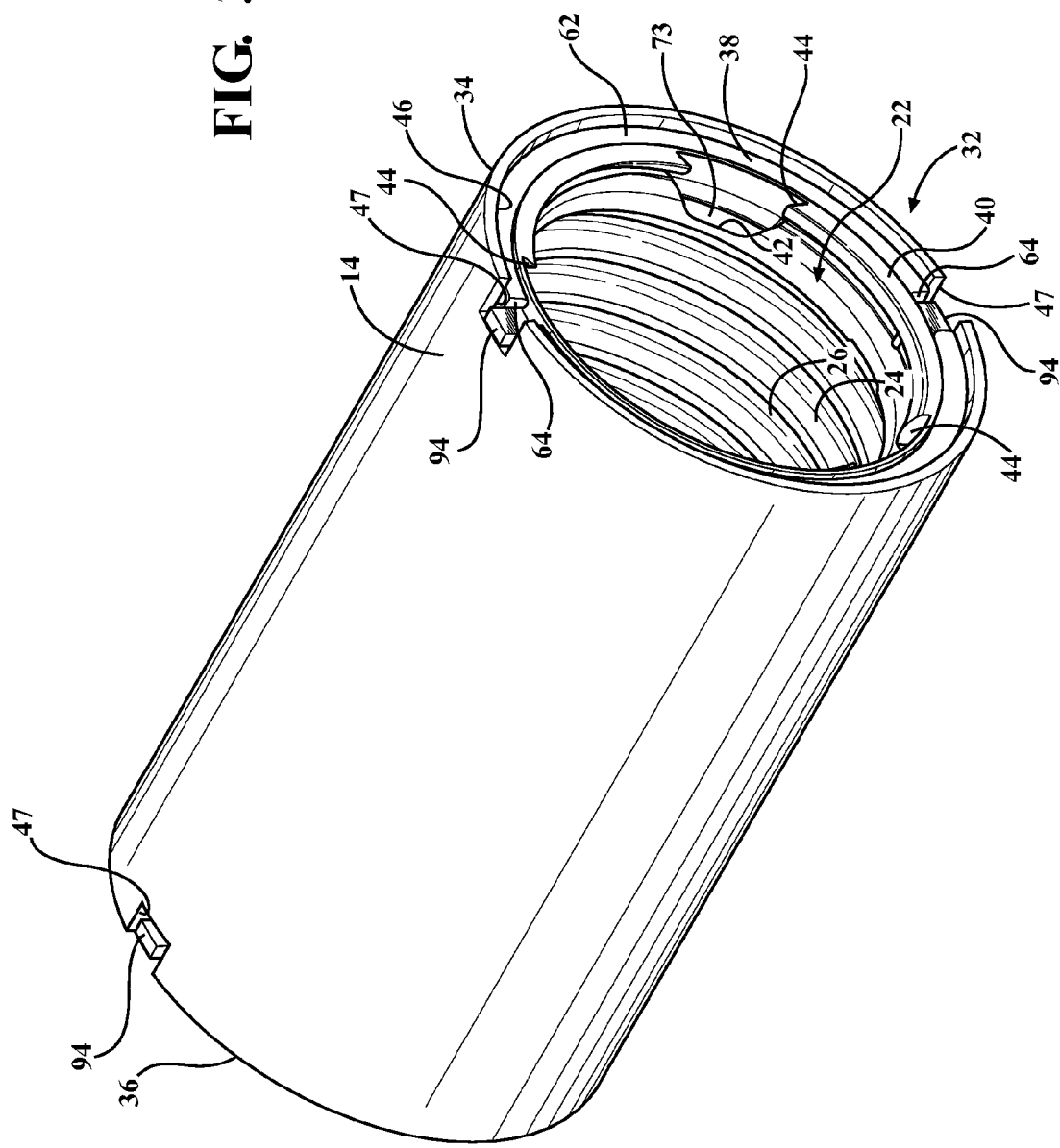
FIG. 3 is a perspective view of a ball nut assembly of the linear motion assembly of FIG. 1.

Referring now in more detail to the drawings, FIGS. 1 and 2 illustrate a linear motion assembly, shown as a ball screw assembly, by way of example and without limitation, referred to hereafter as assembly 10, constructed in accordance with one aspect of the invention. The assembly 10 includes a shaft, also referred to as ball screw or simply screw 12, assembled coaxially within a housing, also referred to as ball nut or simply nut 14, along a central axis 16 about which relative rotation between the screw 12 and nut 14 occurs during use. The screw 12 has a helical external groove 18 extending continuously over a plurality of circumferential turns with a radially outwardly extending, continuous helical land 20 formed between adjacent turns of the external groove 18. The nut 14 has a through bore 22, such as shown in FIG. 2, configured for receipt of the screw 12 therethrough. The nut 14 has a helical internal groove 24 extending over a plurality of circumferential turns with a radially inwardly extending helical land 26 formed between adjacent turns of the internal groove 24. The external groove 18 of the screw 12 is radially aligned with the internal groove 24 of the nut 14 upon assembly to form a ball raceway 28, in which, a plurality of balls 30 are received for circulation therethrough. The balls 30 are recirculated through the raceway 28 with the assistance of any known recirculation button, tube or mechanism, whether internal or external to the nut 14, as known in the art of linear motion assemblies having recirculating balls. The assembly 10 further includes a wiper and scraper assembly 32 constructed in accordance with the invention disposed in opposite ends 34, 36 of the nut 14. The wiper and scraper assembly 32 includes an elastomeric, resilient wiper 38, such as made from rubber, Teflon®, nitrile, and the like, and a tough, rigid scraper 40, such as made from thermoplastics, ceramics, metal, and the like. The scraper 40 is disposed at least in part, or preferably in its entirety, internally within the wiper 38 and is secured therein against removal automatically by a portion of the wiper 38 that is radially collapsed during installation of the assembly 32 within the opposite ends 34, 36 of the nut 14. Upon the scraper 40 being secured within the wiper 38, the wiper 38 and scraper 40 are free to move slightly and independently relative to one another, in very slight axial and radial movement, to prevent binding in use. In addition, the wiper 38 is formed having at least one, or a plurality of axially outwardly facing ejection plows 42, discussed in more detail below, that are axially aligned with a corresponding number of openings, also referred to as through windows or exit ports 44 formed in and extending through a portion of the scraper 40, such that any debris that makes its way past the scraper 40, or otherwise encountering the plows 42 and trying to get past the wiper 38, is pushed or plowed axially outwardly by the plows 42 through the exit ports 44, thereby preventing the ingress of debris into the nut 14.

The nut 14 is generally adapted for attachment to a member (not shown) which is required to move linearly along the axis 16 in response to rotation of the screw 12. The mechanisms for attachment of the nut 14 to the member are generally known, such as via trunnions or direct attachment via fasteners to one or both of the ends of the nut 14, by way of example and without limitation. Alternatively, as is known in the art, the nut 14 could be axially fixed and the screw 12 could be axially translational back and forth through the nut 14. To facilitate installation of the wiper and scraper assembly 32, the nut 14 has counterbores 46 extending into each end 34, 36, wherein the counterbores 46 are generally cylindrical and sized for receipt of the wiper and scraper assemblies 32 therein. In addition, to facilitate preventing relative rotation between the nut 14 and the wiper and scraper assemblies 32, each end 34, 36 of the nut 14 preferably has at least one notch, also referred to as slot 47, extending axially therein and radially therethrough for receipt of a portion of the assembly 32.

With particular reference to FIGS. 10-13, the wiper 38 is shown in detail in an uninstalled state. The wiper 38 has an outer cylindrical wall portion 48 extending from a first side 50 toward an opposite second side 52, and an annular umbrella, also referred to as frustroconical portion 54, extending from the second side 52 to the cylindrical wall portion 48. The frustroconical portion 54 extends in oblique relation with the cylindrical wall portion 48 in radially outwardly extending relation from the cylindrical wall portion 48 when in a disassembled state. During assembly, the cylindrical wall portion 48 is sized for close receipt in the counterbores 46 of the ball nut 14, such as in a line-to-line or slight clearance fit, while the frustroconical portion 54 is sized for an interference fit in the counterbores 46 of the ball nut 14. The frustroconical portion 54 is flared conically, and diverges radially outwardly away from the cylindrical portion 48 to the enlarged diameter second side 52 while in an uninstalled, relaxed state. The frustroconical portion 54 is elastically compressed and biased radially inwardly via an interference fit within a cylindrical surface of the counterbore 46 in the nut 14 while being installed, and remains elastically compressed and biased while in the fully installed state to both establish a contact seal against the cylindrical surface of the counterbore 46, while also facilitating retention of the scraper 40 within the wiper 38, thereby preventing the scraper 40 from axially separating from the wiper 38. The frustroconical portion 54 has at least one recessed notch, and shown as a pair of diametrically opposite recessed notches 64 extending axially into the second side 52 for receipt of a portion of the scraper 40 to prevent unwanted relative rotation between the wiper 38 and the scraper 40.

The wiper 38 has a central opening 56 extending between and through the opposite first and second sides 50, 52, such that the wiper 38 is generally ring or toroid shaped. The wiper 38 has at least one helical internal thread 58 extending into the opening 56 adjacent the first side 50, wherein the helical internal thread 58 is configured for low friction, wiping contact with the external groove 18 of the screw 12, thereby acting to provide a good seal between the thread 58 and the screw 12. The wiper 38 further includes an annular channel or groove 60 (FIG. 10) between the helical internal thread 58 and an annular lip 62, wherein the annular lip 62 extends radially inwardly along the second side 52.

Figure 9:
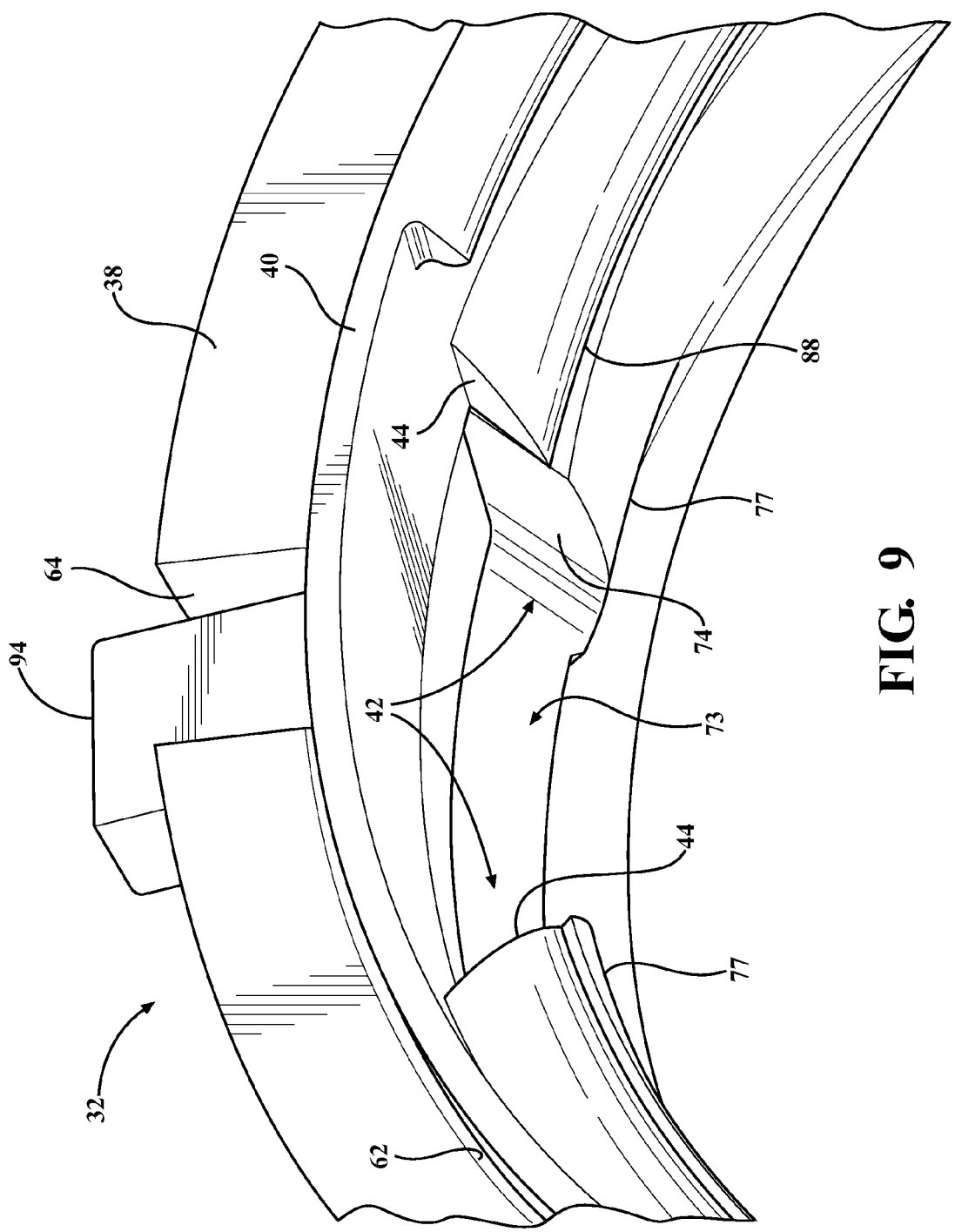
FIG. 9 is an enlarged partial perspective view of the assembled wiper and scraper assembly of FIG. 8.
Figure 10:
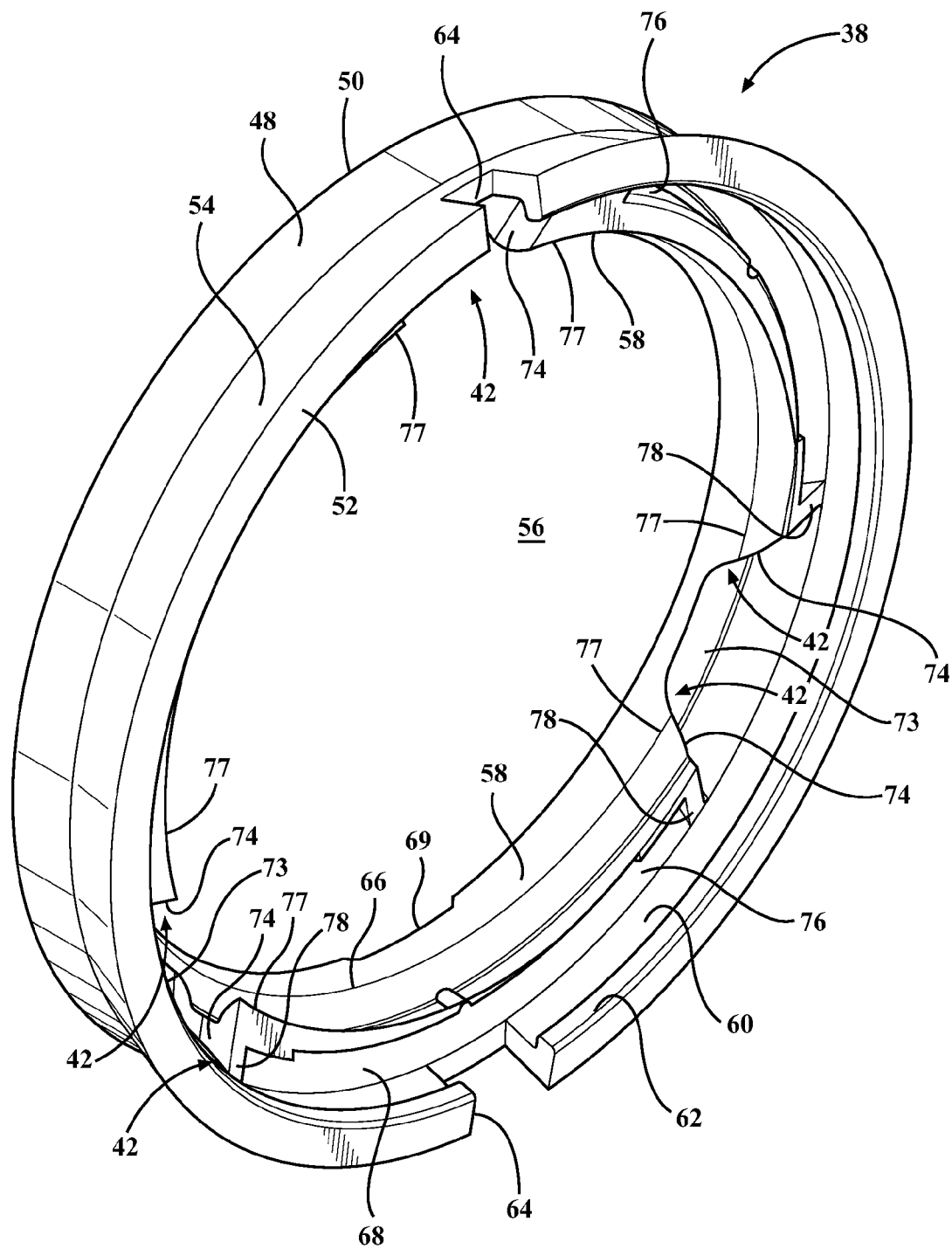
FIG. 10 is a perspective view of a wiper of the wiper and scraper assembly of FIG. 6.
Figure 11:
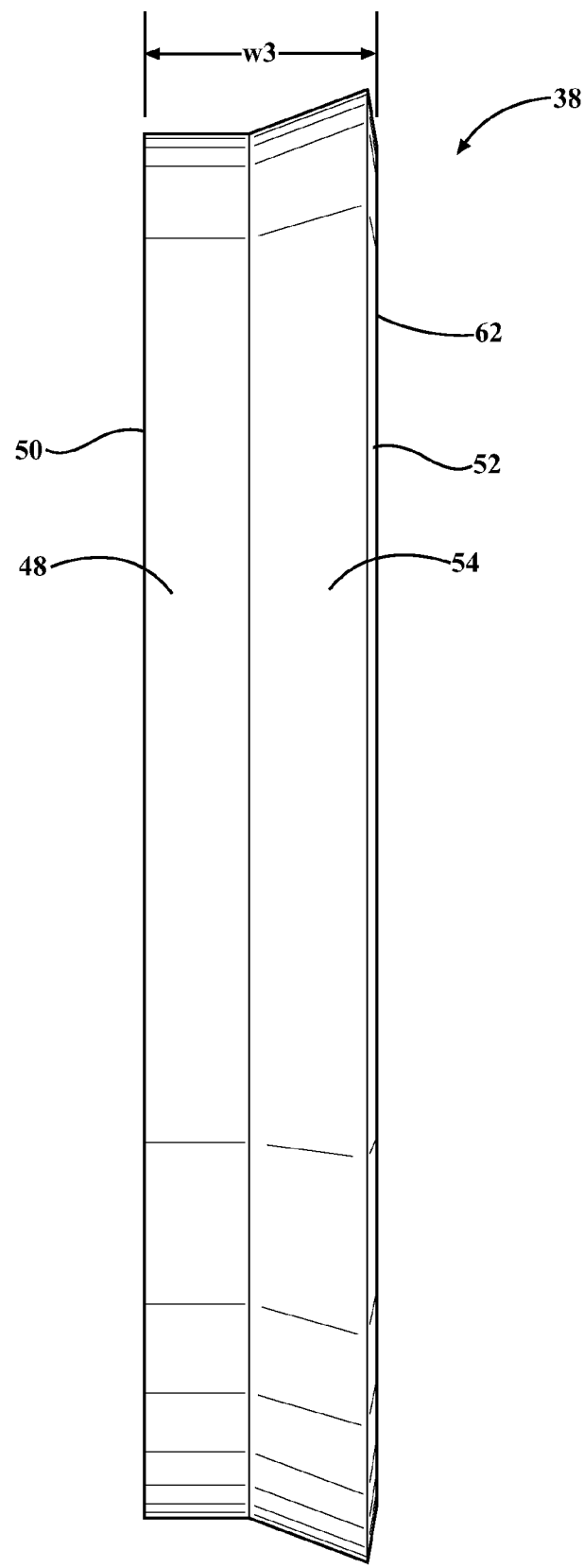
FIG. 11 is a side view of the wiper of FIG. 10.
Figure 12:
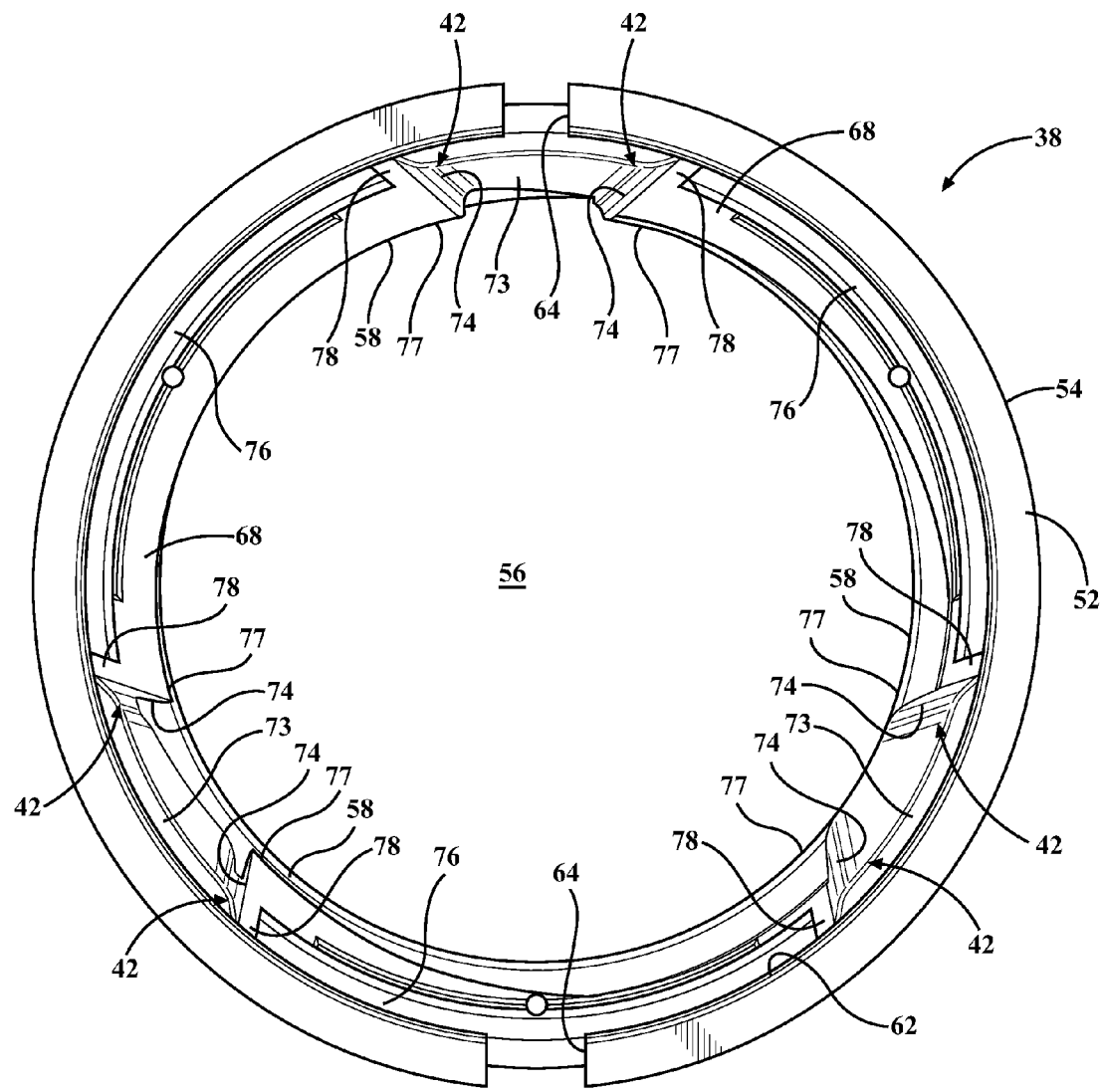
FIG. 12 is a front view of the wiper of FIG. 10.
Figure 13:
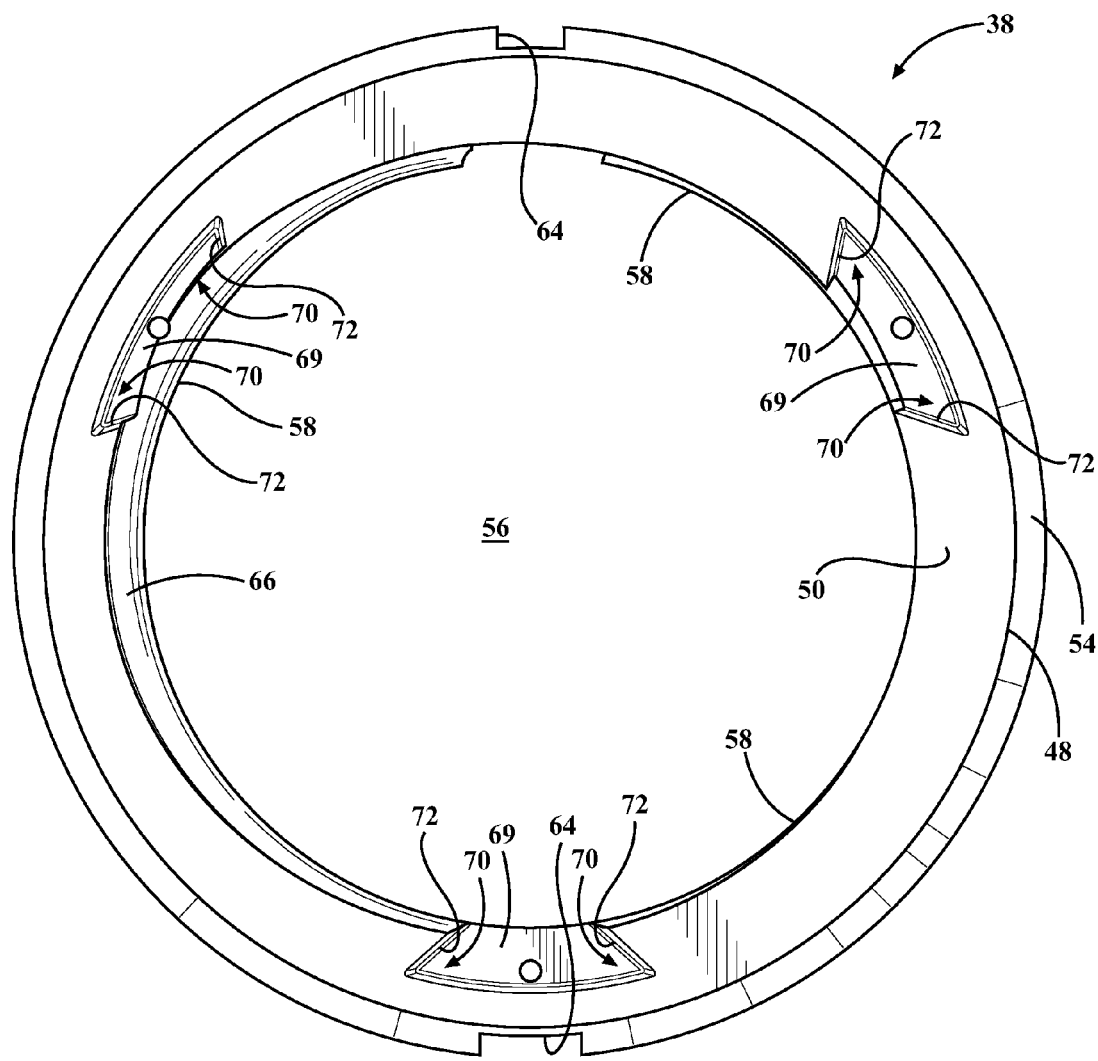
FIG. 13 is a rear view of the wiper of FIG. 10.
Figure 14:
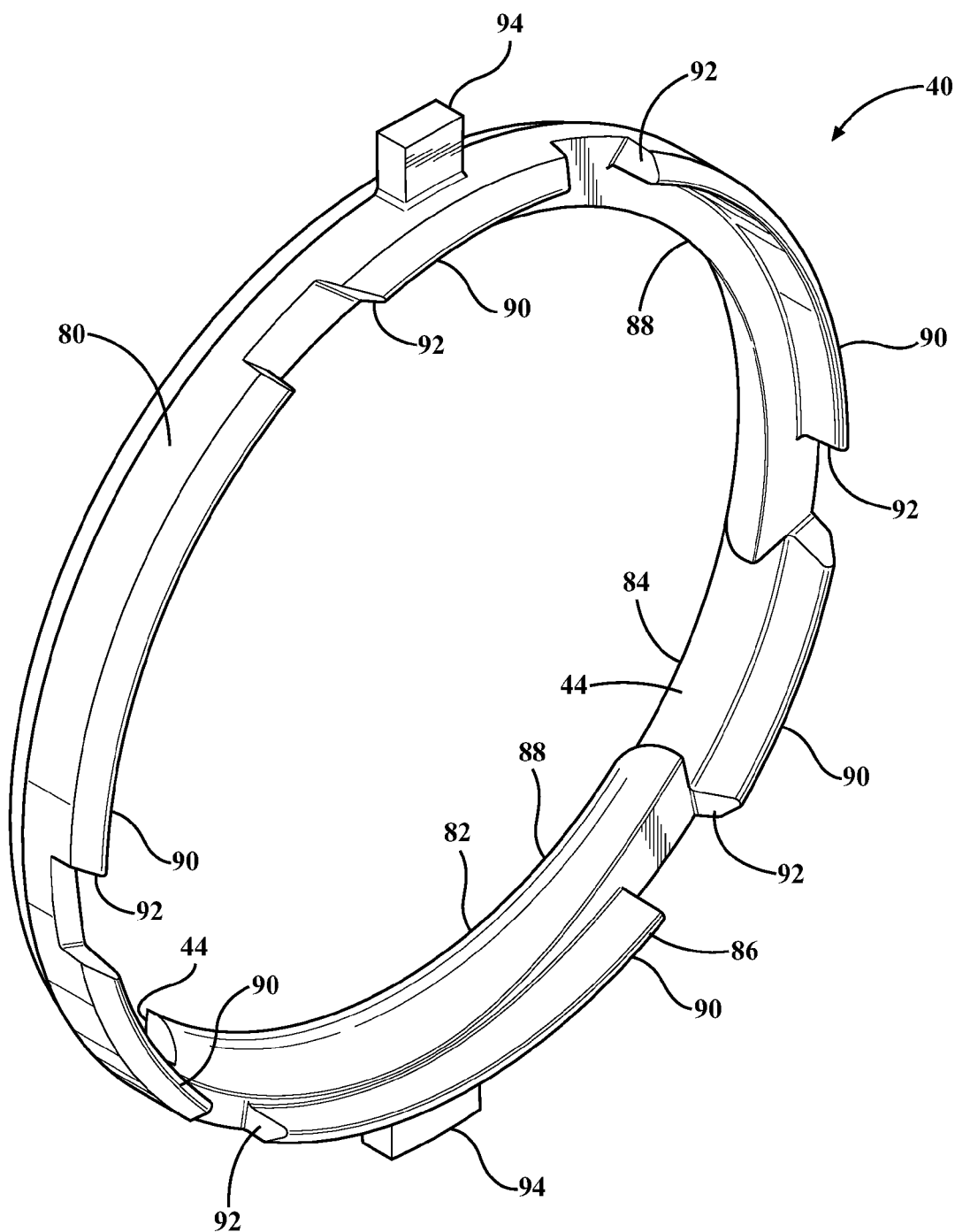
FIG. 14 is a perspective view of a scraper of the wiper and scraper assembly of FIG. 6.
Figure 15:
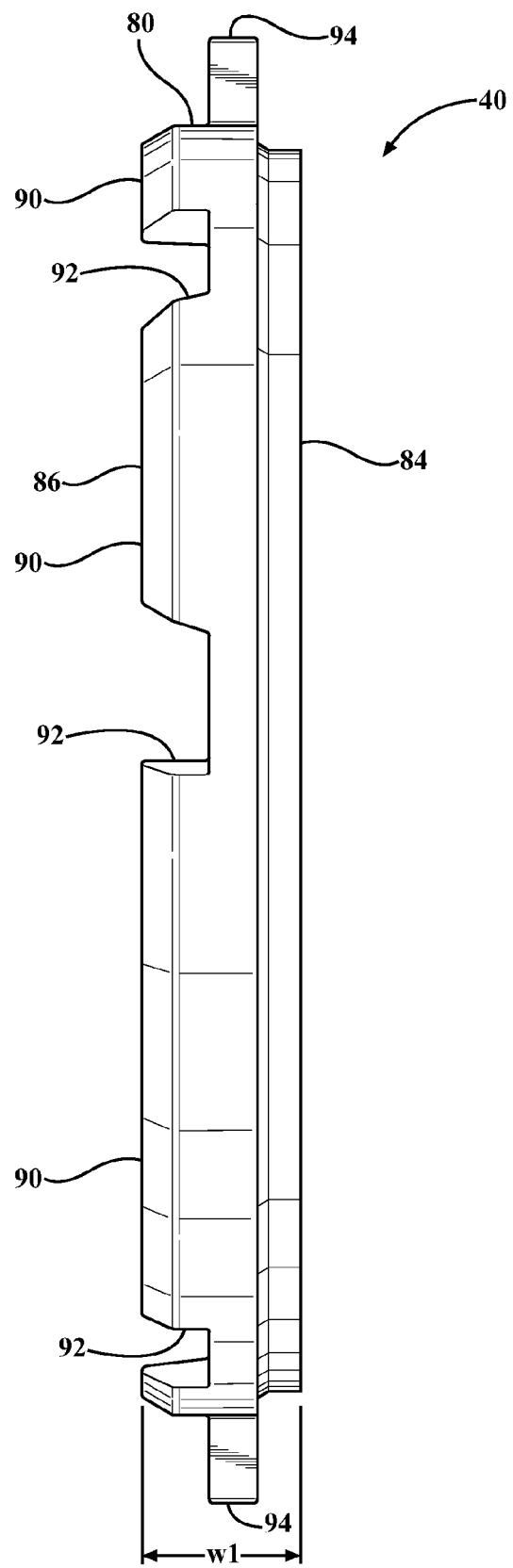
FIG. 15 is a side view of the scraper of FIG. 14.
Figure 16:
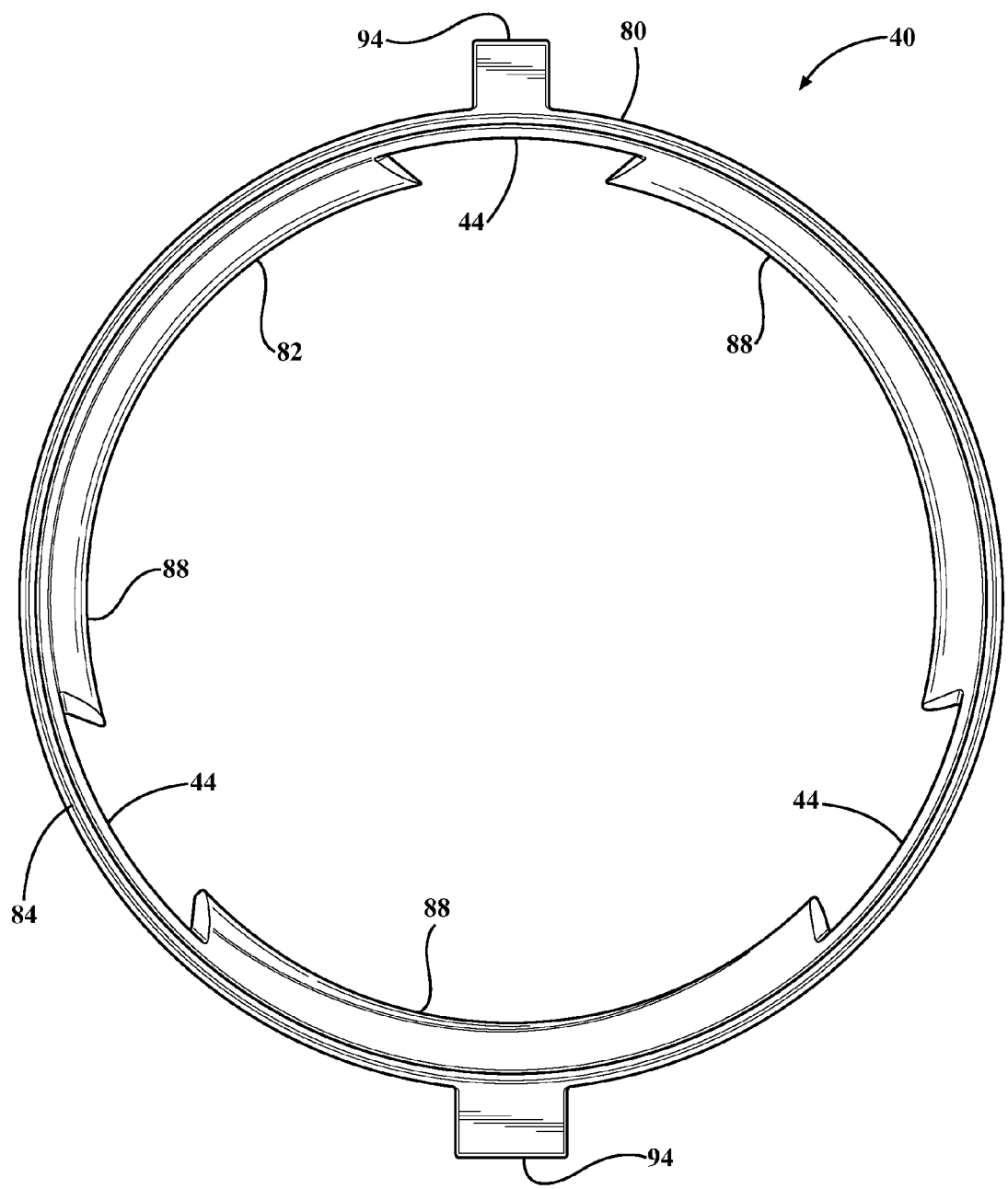
FIG. 16 is a front view of the scraper of FIG. 14.
Figure 17:
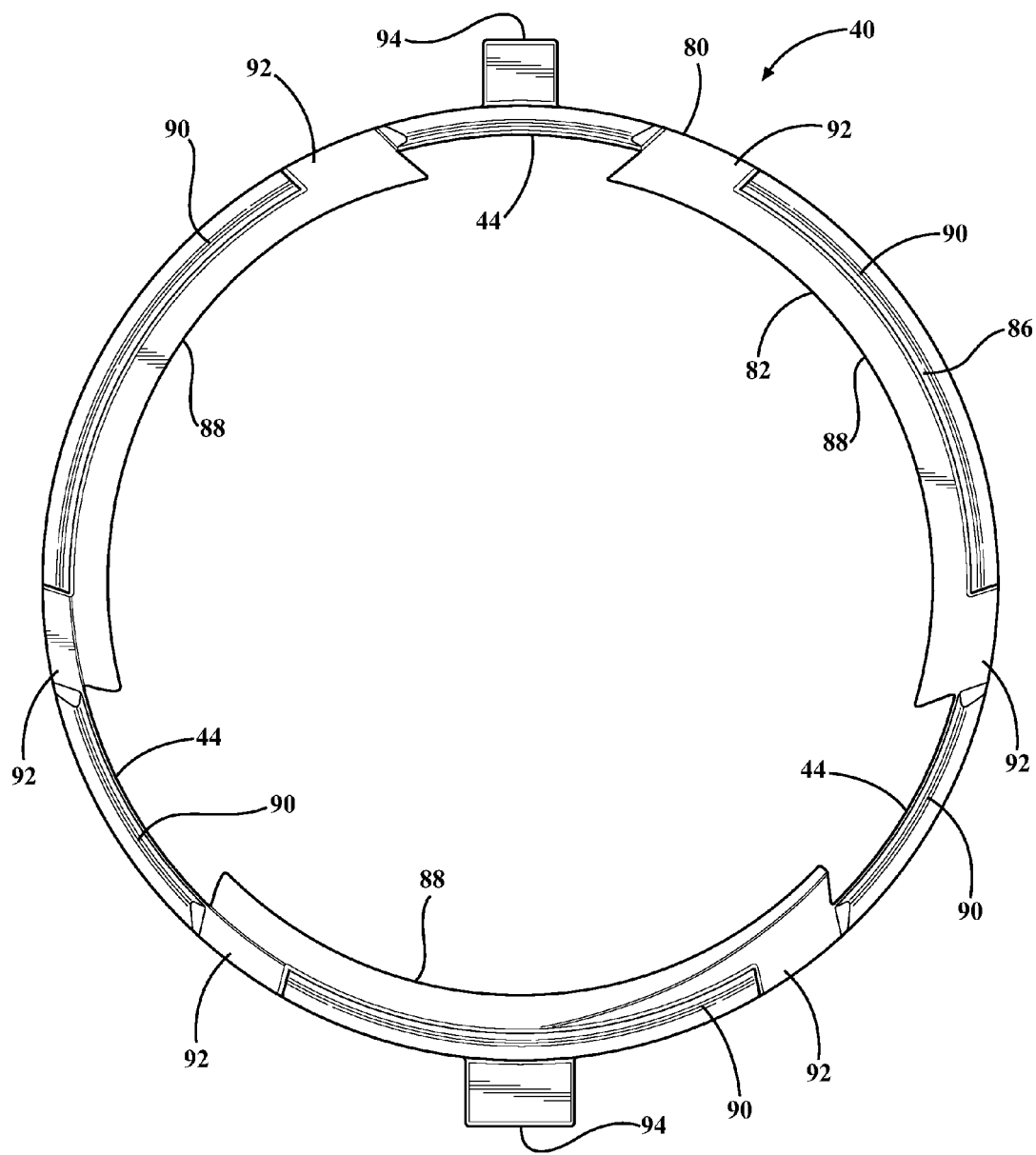
FIG. 17 is a rear view of the scraper of FIG. 14.

The internal thread or threads 58 of the wiper 38 preferably extend a full turn or more, and has faces 66, 68 on opposite sides thereof, with one face 66 facing axially inwardly into the nut 14 and the opposite face 68 facing axially outwardly away from the nut 14. As best shown in FIG. 13, the first side 50, and potentially the inwardly facing face 66, has at least one, and shown as a plurality of recessed pockets 69 extending axially therein, wherein the pockets 69 are shaped to form lubrication return plows 70, wherein the return plows 70 are configured to redirect lubrication axially inwardly into the nut 14, thereby maintaining the lubrication within the nut 14 and preventing the egress of the lubrication. The return plows 70 are shown as having inclined surfaces or sidewalls 72 converging toward the opening 56 to facilitate pumping the lubrication axially inwardly to the nut 14. The outwardly facing face 68 also has at least one, and shown as a plurality of recessed pockets 73 extending axially therein, wherein the pockets 73 are shaped to form the debris ejection plows 42 (FIGS. 9, 10, 12). The debris ejection plows 42 are configured to direct debris axially outwardly away from the nut 14, thereby preventing debris from entering the nut 14. The debris ejection plows 42 are shown as having inclined, compound angle surfaces or sidewalls 74 to facilitate pumping the debris axially outwardly from the nut 14. The outwardly facing face 68 further includes axially recessed, arcuate pockets 76 extending circumferentially between the ejection plows 42 for receipt of a portion of the scraper 40, wherein the pockets 76 are separated from the plows 42 by intervening radially extending ribs or walls 78. To facilitate wiping of the helical external groove 18 of the screw 12 and to facilitate preventing the ingress of debris, the internal thread 58 has a slightly reduced diameter region 77 immediately adjacent the ejection plows 42, thereby promoting the pumping of contaminates axially outwardly via the increased wiping contact immediately adjacent the ejection plows 42.

Figure 4:
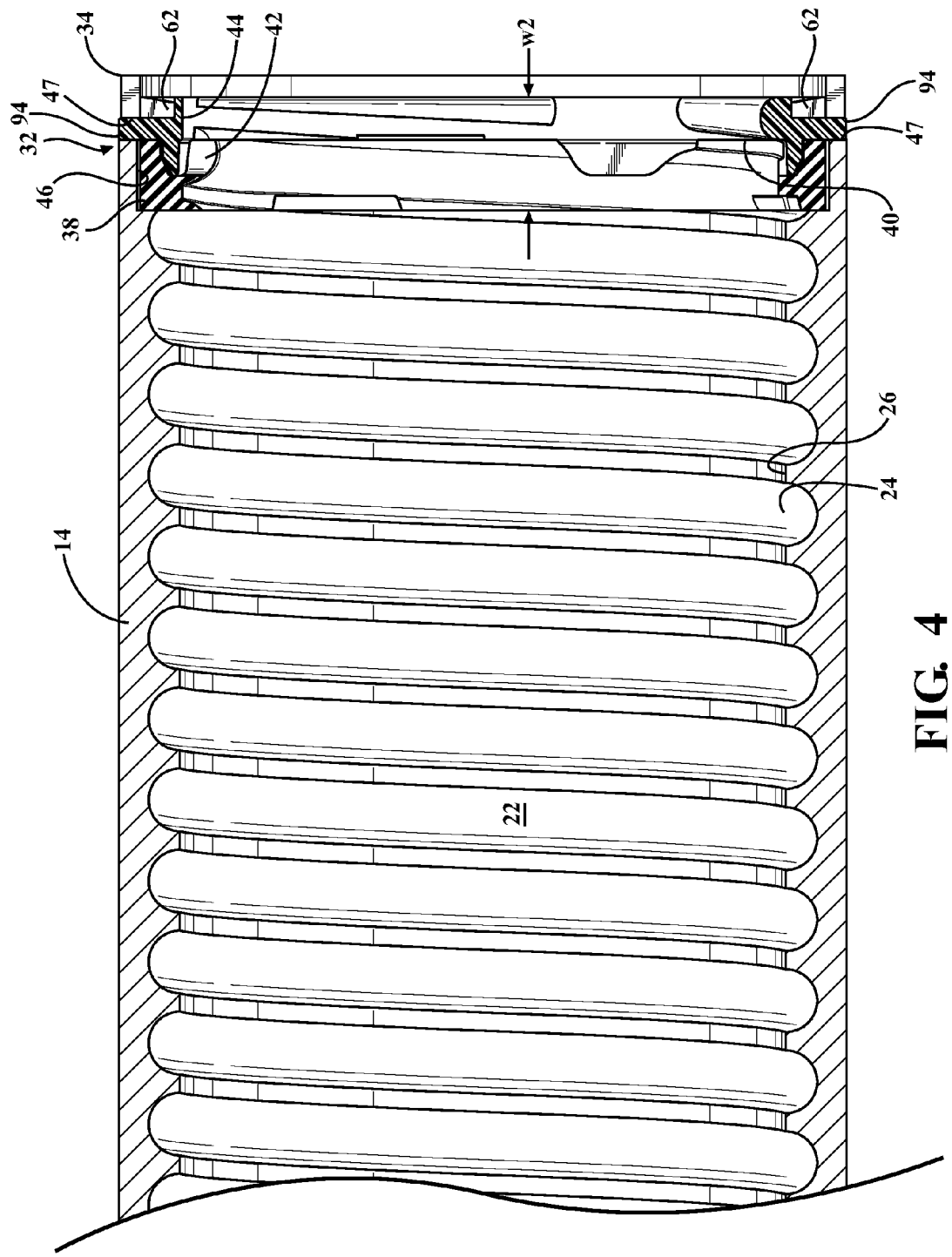
FIG. 4 is a fragmentary cross-sectional view of the ball nut assembly of FIG. 3.

With particular reference to FIGS. 14-17, the scraper 40 has an outer cylindrical wall 80 configured for close receipt in the opening 56 of the wiper 38. The width w1 (FIG. 15) of the scraper 40 is such that when the scraper 40 is disposed within the opening 56 of the wiper 38, the total width w2 (FIG. 4) of the wiper and scraper assembly 32 is equal to the width w3 (FIG. 11) of the wiper 38, thereby minimizing the overall width envelope of the assembly 10. The scraper 40 has an annular inner surface 82 extending between opposite first and second sides 84, 86. The inner surface 82 includes a helical internal thread 88 adjacent the first side 84 and an annular extension portion 90 formed as axially extending tongues or tabs that extend to the second side 86, with a plurality of notches 92 extending between adjacent, circumferentially spaced extension portions 90, wherein the notches 92 are configured for receipt of the walls 78 extending axially into the notches 92. The helical internal thread 88 is configured for a slight clearance fit in the external groove 18 of the screw 12 so as to avoid causing unwanted interference with the screw 12, particularly given the scraper 40 is generally rigid, unlike the elastomeric, resilient wiper 38. The scraper 40 further includes at least one, and shown as a pair of diametrically opposite, radially outwardly extending tabs 94, wherein upon assembly of the scraper 40 inside the wiper 38, the tabs 94 are disposed in the recessed notches 64 of the wiper 38, such that the tabs 90 and recessed notches 64 interact with one another to prevent unwanted degrees of relative rotation between the wiper 38 and the scraper 40.

Figure 5:
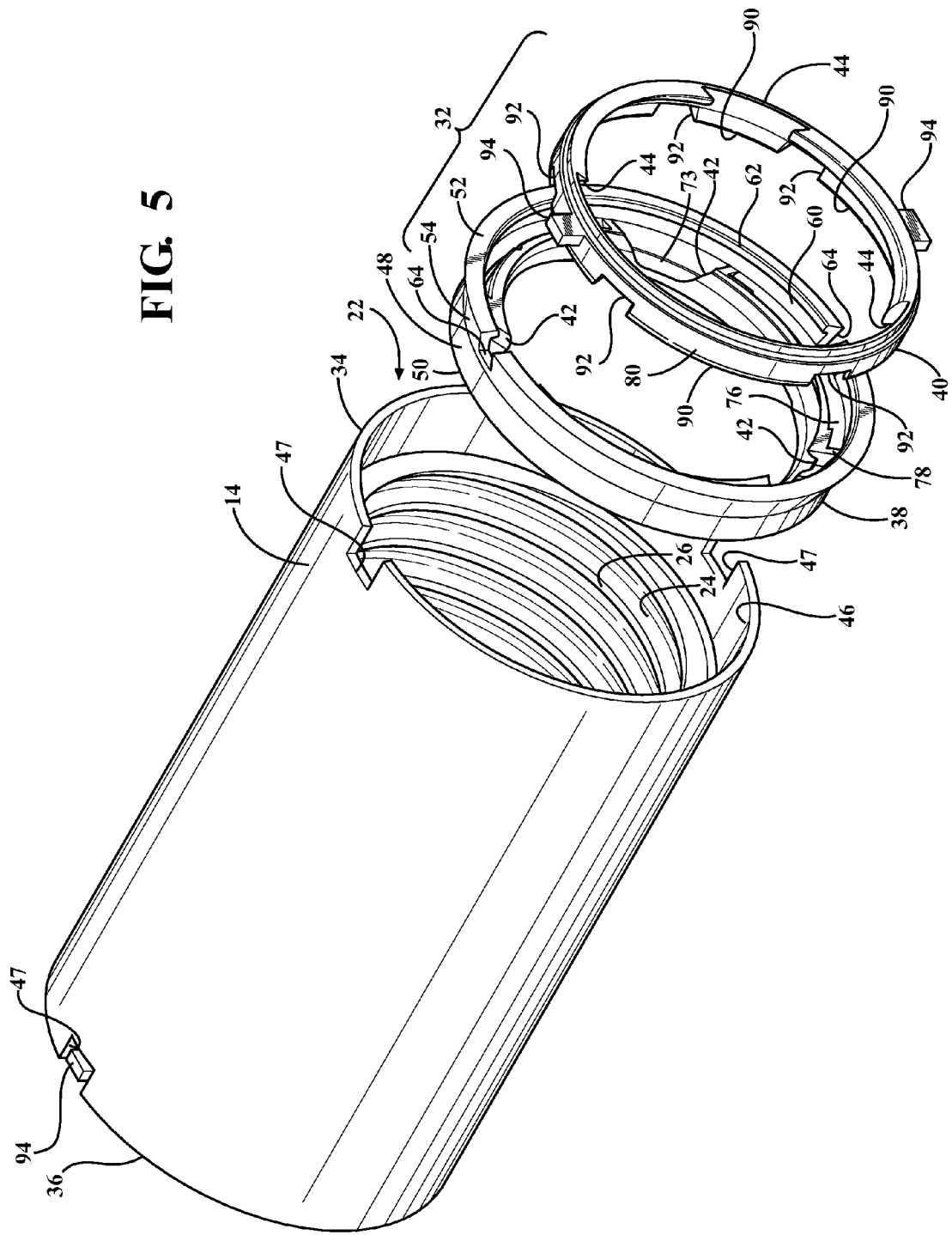
FIG. 5 is a partially exploded view of the ball nut assembly of FIG. 3.
Figure 6:
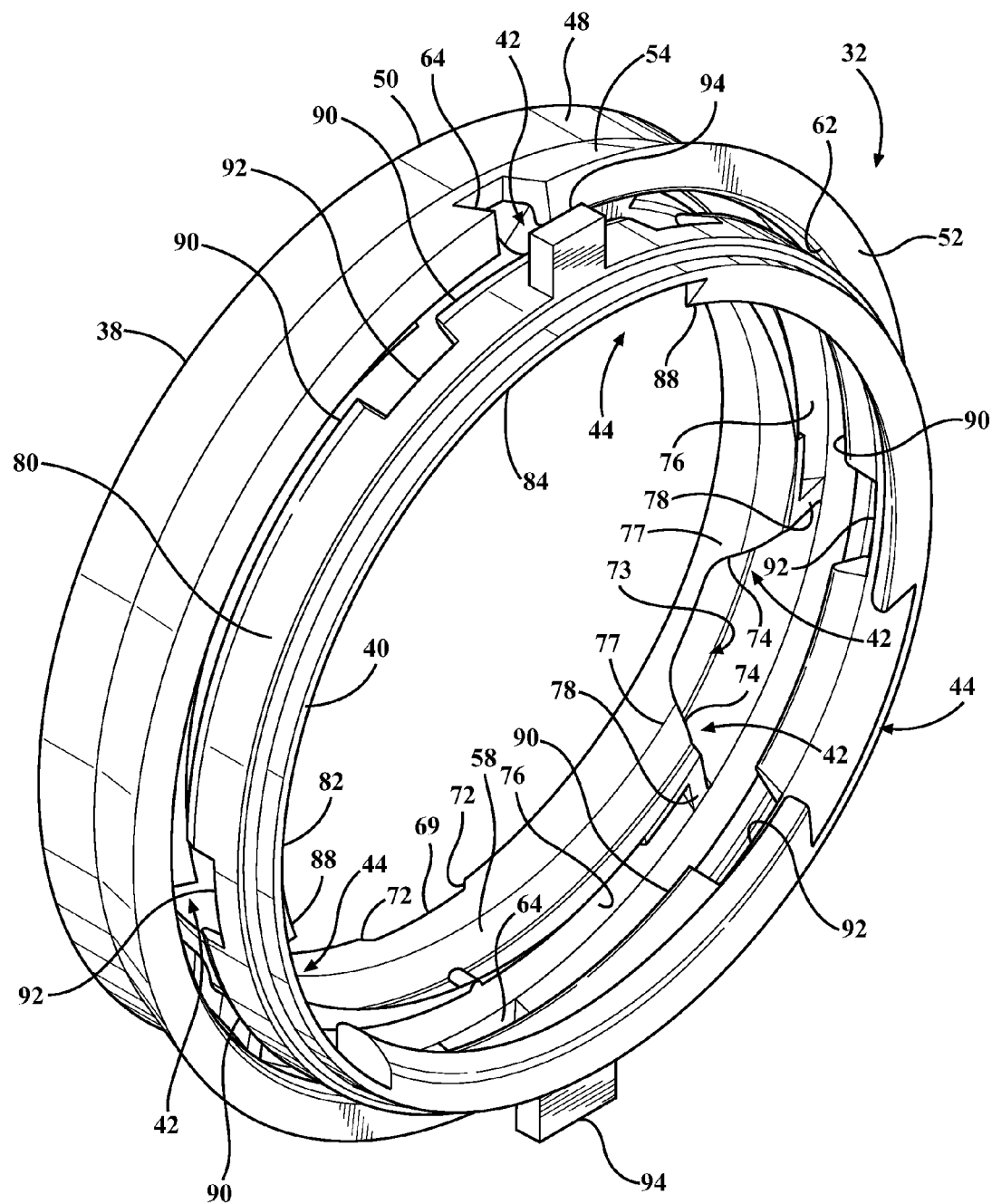
FIG. 6 is an exploded view of a wiper and scraper assembly, constructed in accordance with one aspect of the invention, of the linear motion assembly of FIG. 1.
Figure 7:
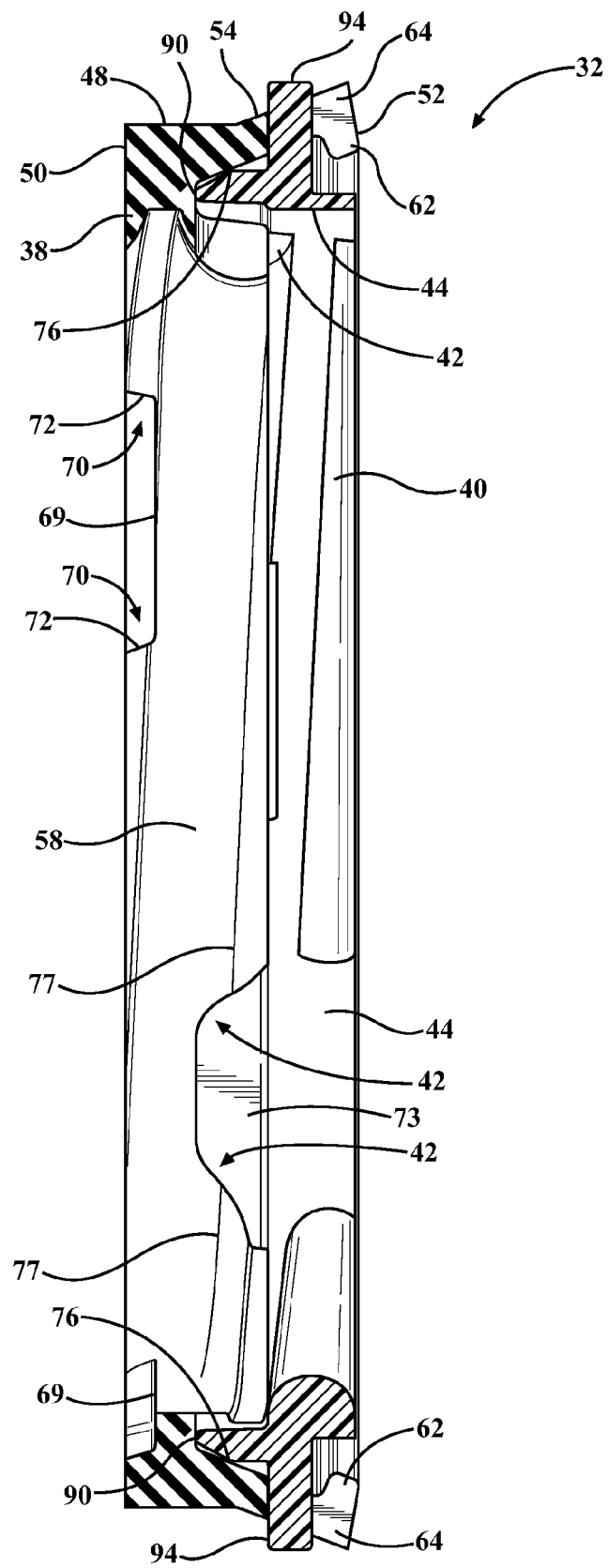
FIG. 7 is an assembled cross-sectional view of the wiper and scraper assembly of FIG. 6 shown prior to be installed in a housing of the ball nut assembly of the linear motion assembly of FIG. 1.
Figure 8:
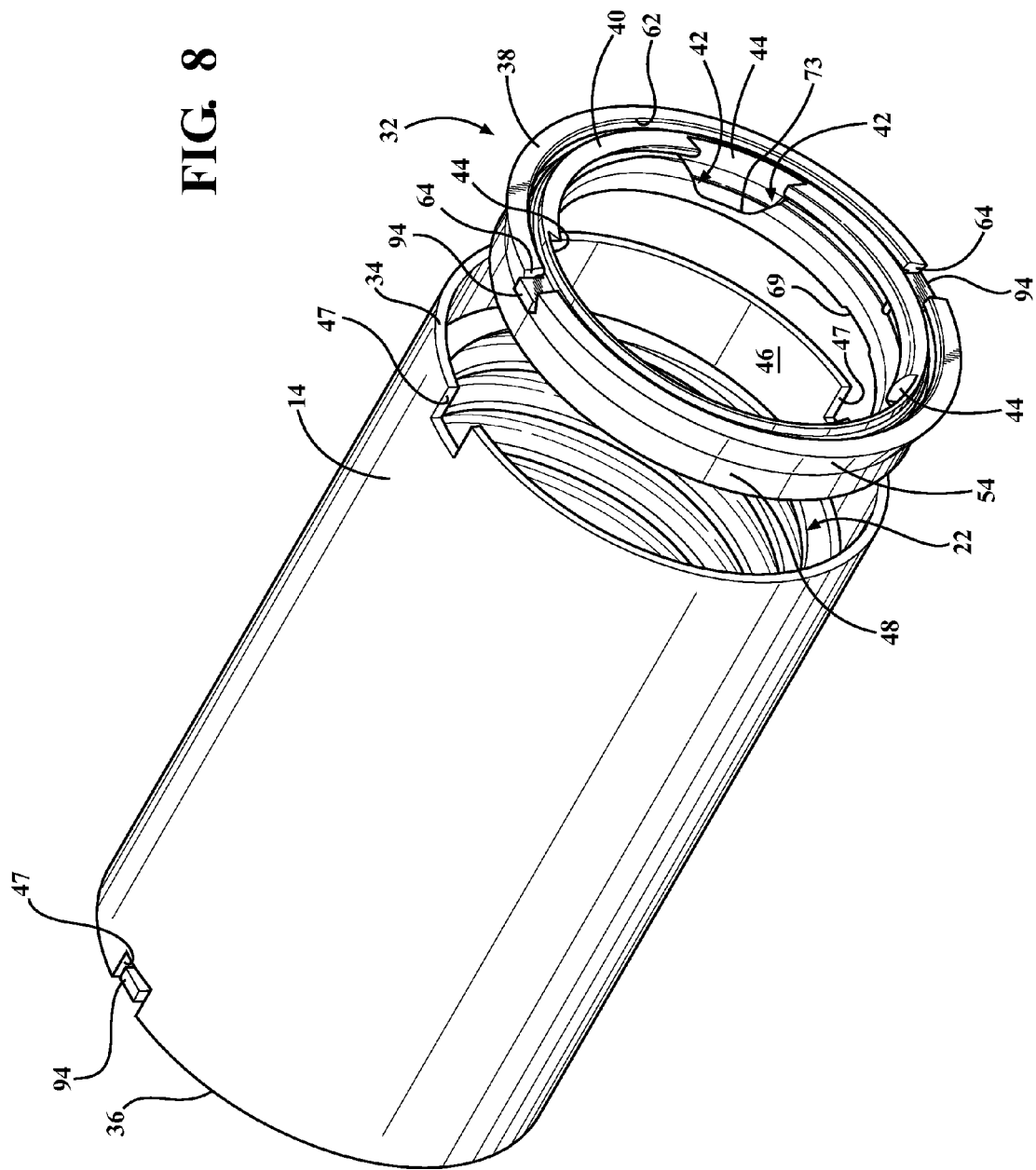
FIG. 8 is a perspective view of the assembled wiper and scraper assembly of FIG. 7 shown exploded from the housing of the ball nut assembly of the linear motion assembly of FIG. 1.

In assembly, the frustroconical portion 54 of the wiper 38 and the annular extension portion 90 of the scraper 40 are oriented to face one another, with the tabs 94 of the scraper 40 being radially and axially aligned with the notches 64 in the wiper 38 (FIGS. 5 and 6). Then, the scraper 40 is moved axially into the wiper 38 such that the annular extension portions 90 of the scraper 40 are disposed in a close fit within the arcuate pockets 76 of the wiper 38, whereupon the walls 78 of the wiper 38 are closely received in the notches 92 of the scraper, and the frustroconical portion 54 of the wiper 38 is brought into radially overlying relation with the outer cylindrical wall 80 of the scraper 40, such that the frustroconical portion 54 and the cylindrical wall 80 are in radial alignment with one another (FIGS. 7 and 8). With the wiper 38 and scraper 40 in their assembled state to form the wiper and scraper assembly 32, the tabs 94 and notches 64 interact to prevent relative rotation between the wiper 38 and scraper 40, however, the scraper 40 remains freely moveable axially away from the wiper 38. Next, the wiper and scraper assemblies 32 are moved axially into their respective counterbores 46 in the opposite ends 34, 36 of the nut 14, with the wiper 38 being axially inward from the scraper 40. As the axial insertion of the wiper and scraper assemblies 32 progresses, the frustroconical portions 54 of the wipers 38 are radially collapsed via radial compression against the inner cylindrical surfaces of the counterbores 46, whereupon the radially inwardly extending lips 62 are biased radially inwardly to extend over a portion of the scrapers 40 to capture the scrapers 40 against axial separation from the wipers 38. At the same time of insertion of the wiper and scraper assemblies 32 into the nut 14, the tabs 94 of the scrapers 40 are moved axially into the slots 47 of the nut 14, thereby securing the assemblies 32 against unwanted degrees of relative rotation to the nut 14. Then, upon disposing the assemblies 32 within their respective counterbore 46, the screw 12 can be disposed through the nut 14 and balls 30 can be loaded within the raceway 28 in any known manner. Accordingly, a simplified, economical assembly process is provided via receipt of the tabs 94 of the scraper 40 within the notches 64 of the wiper 38 and in the slots 47 of the nut 14, and further with the automatic retention provided by the radially collapsing of the frustroconical portion 54 of the wiper 38 about the scraper 40. Thus, there is no need for secondary retention or locking features, such as set screws and the like.

It should be recognized that upon reading the disclosure herein, one ordinarily skilled in the art of ball screw assemblies would readily recognize other embodiments than those expressly discussed herein, with those embodiments being within the spirit and scope of the invention. The scope of the invention is defined by the following claims, and any claims which issue as a result of an application related hereto.

What is claimed is:

1. A linear motion assembly, comprising:
    a ball nut having a through bore extending between opposite ends, said through bore having an internal helical groove;
    a screw having an external helical thread disposed through said through bore of said ball nut, said external helical groove being radially aligned with said internal helical groove to define a ball raceway; and
    a wiper and scraper assembly disposed in each of said opposite ends of said ball nut, each of said wiper and scraper assemblies including a wiper and a scraper constructed from separate pieces of material, said wiper having a width extending between opposite sides with an opening extending through said opposite sides and having a first helical thread received in said external groove of said screw, said scraper being disposed in said opening of said wiper and having a second helical thread received in said external groove of said screw, said wiper having at least one lubrication return plow extending into one of said opposite sides and facing axially inwardly to said ball nut to maintain lubrication within said ball nut, and said wiper having at least one debris ejection plow formed in said first helical thread and facing axially outwardly from said ball nut and being configured to push debris axially outwardly from said ball nut.

2. The linear motion assembly of claim 1 wherein said thread of said scraper has at least one window axially aligned with said at least one debris ejection plow to allow the debris to be expelled by said at least one debris ejection plow through said at least one window.

3. The linear motion assembly of claim 1 wherein said wiper and scraper assembly has a total width substantially the same as said width of said wiper.

4. The linear motion assembly of claim 3 wherein said wiper has an outer wall with a portion overlying and retaining said scraper against axial separation from said wiper.

5. The linear motion assembly of claim 4 wherein said outer wall of said wiper has a cylindrical portion and a frustroconical portion extending radially outwardly from said cylindrical portion, said frustroconical portion being biased radially inwardly by said ball nut to retain said scraper against axial separation from said wiper and scraper assembly.

6. The linear motion assembly of claim 5 wherein said ball nut has at least one slot extending into each of said opposite ends, said frustroconical portion of said wiper has at least one recessed notch, and said scraper has at least one radially outward extending tab disposed in said at least one slot and said at least one recessed notch to prevent relative rotation between said ball nut, said wiper and said scraper.

7. A wiper and scraper assembly for a linear motion assembly, comprising:
    a wiper having a width extending between opposite sides with an opening extending through said opposite sides and having a radially inwardly extending first helical thread, and having at least one lubrication return plow extending into one of said opposite sides and facing axially in a first direction and having at least one debris ejection plow formed in said first helical thread and facing axially in a second direction opposite said first direction; and
    a scraper disposed in said opening of said wiper and having a radially inwardly extending second helical thread, and having at least one window axially aligned with said at least one debris ejection plow of said wiper to allow the debris to be expelled by said at least one debris ejection plow through said at least one window.

8. The wiper and scraper assembly of claim 7 wherein said wiper and scraper assembly has a total width substantially the same as said width of said wiper.

9. The wiper and scraper assembly of claim 8 wherein said wiper has an outer wall with a portion overlying and retaining said scraper against axial separation from said wiper.

10. The wiper and scraper assembly of claim 9 wherein said outer wall of said wiper has a cylindrical portion and a frustroconical portion extending radially outwardly from said cylindrical portion, said frustroconical portion being configured to be biased radially inwardly to retain said scraper against axial separation from said wiper and scraper assembly.

11. The wiper and scraper assembly of claim 10 wherein said frustroconical portion of said wiper has at least one recessed notch, and said scraper has at least one radially outward extending tab disposed in said at least one recessed notch to prevent relative rotation between said wiper and said scraper.

12. A method of assembling a linear motion assembly; comprising:
    providing a ball nut having a through bore extending between opposite ends and having an internal helical groove;
    providing a screw having an external helical thread;
    providing a plurality of balls;
    providing a pair of wipers, each of said wipers having an outer wall and a width extending between opposite sides of said wall with an opening extending through said opposite sides and having a radially inwardly extending first helical thread, at least one lubrication return plow extending into one of said opposite sides and facing axially in a first direction and at least one debris ejection plow formed in said first helical thread and facing axially in a second direction opposite said first direction, said outer wall having a cylindrical portion and a frustroconical portion extending radially outwardly from said cylindrical portion;

providing a pair of scrapers, each of said scrapers having a radially inwardly extending second helical thread, and having at least one window extending through said second helical thread;

disposing the scrapers in the openings of the wipers to form wiper and scraper assemblies, with said at least one window being axially aligned with said at least one debris ejection plow;

disposing said screw through said through bore of said ball nut;

disposing said wiper and scraper assemblies about said screw and into the opposite ends of the ball nut with the cylindrical portions extending into said ball nut and the frustroconical portions of the wipers being automatically biased radially inwardly via an interference fit in said through bore to capture said scraper against axial separation from said wiper; and loading said balls into said through bore between said internal groove and said external groove.

13. The method of claim 12 further including providing the frustroconical portions having a radially inwardly extending lip and capturing the scrapers against axial separation from the wipers with the lips as the frustroconical portions are biased radially inwardly.

14. The method of claim 13 further including providing each of the frustroconical portions with at least one recessed notch, and providing each of the scrapers having at least one radially outward extending tab, and disposing the tabs in the recessed notches to prevent relative rotation between said wiper and said scraper.

15. The method of claim 14 further including providing each of the opposite ends of the ball nut with a slot and disposing the tabs in the slots to prevent relative rotation between the wiper and scraper assemblies and the ball nut.

* * * * *